(12) United States Patent
Horner

(10) Patent No.: US 7,268,527 B2
(45) Date of Patent: Sep. 11, 2007

(54) METHOD AND APPARATUS FOR DETERMINING LOAD CURRENT IN A CPU CORE VOLTAGE REGULATOR

(75) Inventor: Jon Horner, Simi Valley, CA (US)

(73) Assignee: Semtech Corporation, Camarillo, CA (US)

( * ) Notice: Subject to any disclaimer, the term of this patent is extended or adjusted under 35 U.S.C. 154(b) by 156 days.

(21) Appl. No.: 11/078,034

(22) Filed: Mar. 11, 2005
(Under 37 CFR 1.47)

(65) Prior Publication Data

US 2005/0270005 A1 Dec. 8, 2005

Related U.S. Application Data

(60) Provisional application No. 60/552,780, filed on Mar. 11, 2004.

(51) Int. Cl.
*G05F 1/565* (2006.01)
*G05F 1/618* (2006.01)

(52) U.S. Cl. .................................... 323/285; 323/284

(58) Field of Classification Search ............. 323/224, 323/365, 268, 271, 282, 284, 285, 351
See application file for complete search history.

(56) References Cited

U.S. PATENT DOCUMENTS

| 6,995,549 B2 * | 2/2006 | Walters ..................... 323/273 |
| 7,042,203 B2 * | 5/2006 | Van Der Horn et al. .... 323/285 |
| 2005/0149770 A1 * | 7/2005 | Koertzen et al. .......... 713/300 |

* cited by examiner

*Primary Examiner*—Gary L Laxton
(74) *Attorney, Agent, or Firm*—O'Melveny & Myers LLP

(57) ABSTRACT

An apparatus and method for measuring output current and power in real-time is provided for a CPU core powered by a DC-to-DC power converter having active voltage positioning. In an embodiment of the invention, a switched mode power converter comprises at least one power switch operatively coupled to an input voltage source, an output filter operatively coupled to the at least one power switch to provide an output voltage and output current to a load, and a control circuit coupled to the at least one power switch. The control circuit activates the power switch with a duty cycle controlled to regulate at least one of the output voltage and the output current. The control circuit receives a first control signal defining a desired value for the output voltage, a second control signal defining a relationship between voltage input and current draw for the load, and a voltage sense signal corresponding to an actual value of the output voltage. The control circuit thereby provides a measurement of load current.

23 Claims, 3 Drawing Sheets

METHOD AND APPARATUS FOR DETERMINING LOAD CURRENT IN A CPU CORE VOLTAGE REGULATOR

RELATED APPLICATION DATA

This patent application claims priority pursuant to 35 U.S.C. § 119(c) to provisional patent application Ser. No. 60/552,780, filed Mar. 11, 2004.

BACKGROUND OF THE INVENTION

1. Field of the Invention

The present invention relates to DC-to-DC power converter circuits for regulating central processing unit (CPU) core voltages, and more particularly, to the determination of load current and power consumption by a CPU core without use of a sense resistor.

2. Description of Related Art

Switched mode DC-to-DC power converters are commonly used in the electronics industry to convert an available direct current (DC) level voltage to another DC level voltage. A switched mode converter provides a regulated DC output voltage by selectively storing energy by switching the flow of current into an output inductor coupled to a load. A synchronous buck converter is a particular type of switched mode converter that uses two power switches, such as MOSFET transistors, to control the flow of current in the output inductor. A high-side switch selectively couples the inductor to a positive power supply voltage while a low-side switch selectively couples the inductor to ground. A pulse width modulation (PWM) control circuit is used to control the gating of the high-side and low-side switches. Synchronous buck converters generally offer high efficiency and high power density, particularly when MOSFET devices are used due to their relatively low on-resistance.

Synchronous buck converters are particularly advantageous for use in providing power to electronic systems, such as microprocessors having demanding power requirements. Conventional microprocessors, or core CPU's, generally require a voltage ($V_{CC}$) of 1 to 1.5 volts with current ranging from 40 to 60 amps and can have highly transient power demands. When the core CPU executes certain operations, current demand can ramp up as much as 50 amps at a slew rate of approximately 1 amp per nanosecond. The current demand can also ramp down just as quickly after the microprocessor operations are completed. This rapid change in current draw has a direct effect upon the output voltage. Specifically, when there is a rapid demand for current, this pulls the output voltage downward, a phenomenon known as "voltage droop." Conversely, when the current demand is curtailed, the output voltage swings upward. Conventional core voltage regulators make use of active voltage positioning, a method in which the regulated output voltage decreases linearly with an increase in load current. The load-line defines voltage input ($V_{CC}$) as a function of current draw ($I_{CC}$) for an integrated circuit product such as a microprocessor. The ratio of change in voltage with respect to the change in load current is referred to as the load-line slope.

In some applications, it is necessary to provide real-time measurement of CPU current as well as power consumption. There are several known ways to measure the output load current. One such approach is to include a sensing resistor in series with the output inductor and to monitor the voltage drop across the sensing resistor. The sensing resistor must have a resistance value large enough to keep the sensed voltage signal above the noise floor, as the voltage drop can be measured more accurately with a higher resistance value. A significant drawback of this approach is that the sensing resistor wastes the output energy and thereby reduces the efficiency of the synchronous buck converter. Moreover, the sensing resistor generates heat that must be removed from the system.

Another approach to measuring the load current is to place the sensing resistor on the input side of the converter in series with the drain of the high-side switch (i.e., MOSFET) and monitor the voltage drop across the sensing resistor as in the preceding approach. In this position, the amount of energy dissipated by the sensing resistor is substantially less than in the aforementioned position in series with the output inductor. A drawback of this approach is that the high-side switch changes state at a relatively high rate (e.g., greater than 250 KHz) and, as a result, the high-side switch current is discontinuous. When the high-side switch turns on, the current through the switch and the sensing resistor starts at zero and increases rapidly before settling and then returning to zero when the high-side switch turns off. The information obtained from sampling the voltage across the sensing resistor must therefore be utilized during a subsequent switching cycle, making it necessary to include "sample and hold" circuitry to store the sampled information from cycle to cycle. Not only does this add complexity to the converter, but there is also a time delay in regulating the output current that diminishes the stability of the converter. Additionally, this approach becomes difficult to implement and hence impractical at very high switching rates (e.g., approximately 1 GHz) due to bandwidth requirements.

It is also known to use the internal resistance ($R_{DSON}$) of the MOSFET switches as a sensing resistor. The advantage of this method is that there is no additional loss in energy by using the $R_{DSON}$ as the sensing resistor since this energy loss is already an inherent part of converter operation. Due to the low duty cycle of the MOSFET switches, it is generally necessary to use the low-side switch as the sensing resistor. The voltage drop across the low-side switch is measured and averaged using a slow time loop to sense the output current. While this approach provides an accurate measurement of output current, it is generally too slow to provide effective information for current load control.

Accordingly, it would be desirable to provide real-time output current and power measurement for a CPU core powered by a DC-to-DC power converter having active voltage positioning without these drawbacks of the prior art.

SUMMARY OF THE INVENTION

The present invention overcomes the disadvantages of the prior art by providing an apparatus and method for measuring output current and power in real-time for a CPU core powered by a DC-to-DC power converter having active voltage positioning.

In an embodiment of the invention, a switched mode power converter comprises at least one power switch operatively coupled to an input voltage source, an output filter operatively coupled to the at least one power switch to provide an output voltage and output current to a load, and a control circuit coupled to the at least one power switch. The control circuit activates the power switch with a duty cycle controlled to regulate at least one of the output voltage and the output current. The control circuit receives a first control signal defining a desired value for the output voltage, a second control signal defining a relationship between voltage input and current draw for the load, and a voltage sense signal corresponding to an actual value of the output voltage. The control circuit thereby provides a measurement of load current in accordance with the following equation:

$$I_{LOAD} = (V_{DAC} - V_{OUT}) / AVP_{SLOPE}$$

wherein, $V_{DAC}$ is the desired output voltage, $V_{OUT}$ is the voltage sense signal, $AVP_{SLOPE}$ is the slope of the load-line signal, and $I_{LOAD}$ is the load current.

In another embodiment of the invention, a method for monitoring load current drawn by a microprocessor comprises the steps of (a) providing a regulated output voltage and output current to the microprocessor, (b) receiving a first control signal defining a desired value for the output voltage, a second control signal defining a relationship between voltage input and current drawn by the microprocessor, and a voltage sense signal corresponding to an actual value of the output voltage, and (c) deriving the microprocessor load current in accordance with the equation set forth above.

A more complete understanding of the method and apparatus for monitoring load current drawn by a core CPU will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for a way to provide real-time output current and power measurement for a DC-to-DC power converter having active voltage positioning. In the detailed description that follows, like element numerals are used to describe like elements illustrated in one or more of the drawings.

Figure 1:
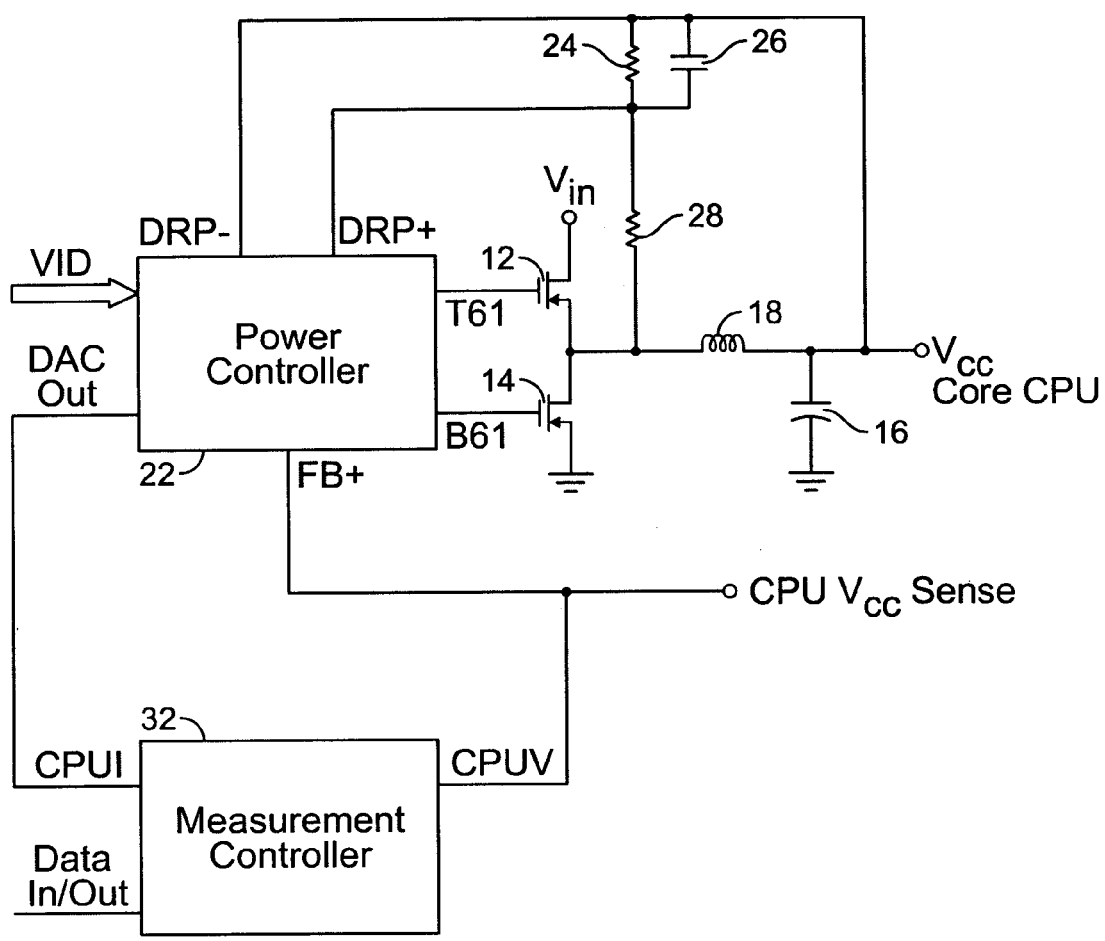
FIG. 1 is a schematic diagram of a DC-to-DC voltage converter in accordance with an embodiment of the invention.

Referring first to FIG. 1, a schematic diagram is shown of a DC-to-DC voltage converter in accordance with an embodiment of the present invention. The DC-to-DC voltage convert provides an output voltage $V_{CC}$ to a core CPU. The DC-to-DC voltage converter includes a high-side switch 12 and a low-side switch 14 connected to the input voltage source $V_{IN}$. The high-side switch 12 and the low-side switch 14 are provided by respective MOSFET devices, with the drain of high-side switch 12 connected to the input voltage source $V_{IN}$, the source of the high-side switch 12 connected to the drain of the low-side switch 14, and the source of the low-side switch 14 connected to ground. An output inductor 18 is connected in series between the output terminal and the junction between the source of the high-side switch 12 and the drain of the low-side switch 14. A power controller circuit 22 is connected to the gates of both the high-side switch 12 (through the TG1 pin) and low-side switch 14 (through the BG1 pin), and generates a series of pulse width modulated control signals for the switches 12, 14 to regulate the output voltage $V_{CC}$. Capacitor 16 is coupled to the output inductor 18 to provide smoothing of the output voltage $V_{CC}$ waveform. While a single-phase DC-to-DC voltage converter has been described with respect to the embodiment of FIG. 1, it should be appreciated that the power controller circuit 22 could control a multiple-phase DC-to-DC voltage converter.

Figure 2:
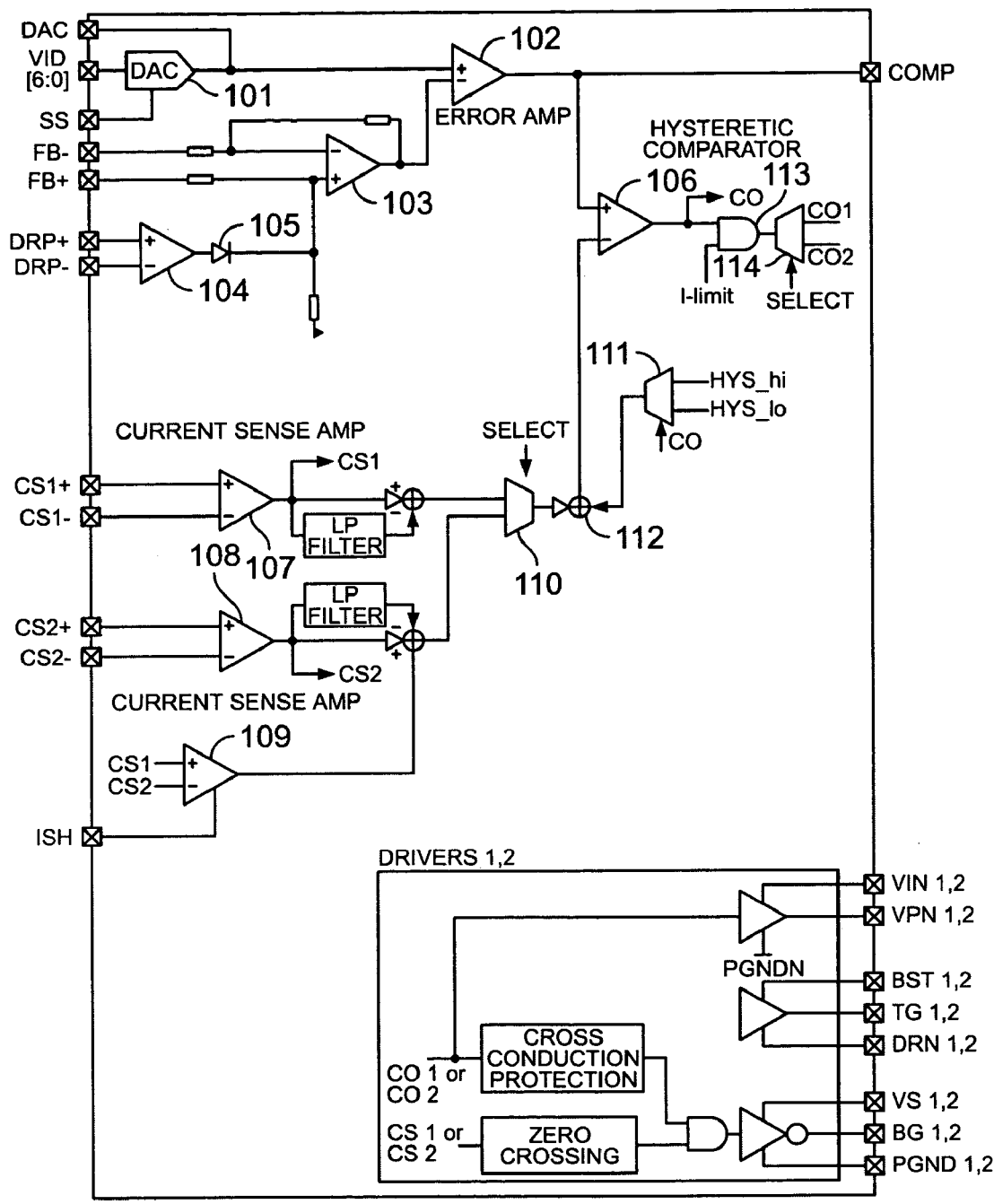
FIG. 2 is a schematic diagram of an embodiment of a power controller circuit for the DC-to-DC voltage converter.

The power controller circuit 22 receives a plurality of control and feedback signals that are used to determine the pulse width modulated control signals. The power controller circuit 22 receives a multibit voltage identification (VID) code provided by the CPU to program the desired CPU core voltage $V_{CC}$. The power controller circuit 22 includes a digital-to-analog converter (DAC) that produces an analog voltage corresponding to the VID code on an output pin (DACOUT). The CPU provides a voltage $V_{CC}$ sense signal that is received by the power controller circuit 22 on a feedback (FB+) pin. The power controller circuit 22 also receives a current droop signal (DRP−, DRP+) that corresponds to changes in the output current. An embodiment of the power controller circuit 22 is shown in FIG. 2 (described below).

The current droop signal may be provided from a filter connected in parallel with the output inductor 18. The filter includes resistors 24, 28 and capacitor 26 connected together in series. The signal passing through the output inductor 18 has a DC component and an AC component. The output inductor 18 is comprised of a wire, such as copper, that has an inherent resistance per unit length that results in a DC resistance value. The AC component of the signal depends on the inductance and internal resistance values of the output inductor 18, as well as the resistance and capacitance of the filter. By selecting the values of the resistors 24, 28 and capacitor 26 to define a time constant having a known relationship with the corresponding time constant of the output inductor 18, the instantaneous voltage across the capacitor 26 can be made equal to the voltage across the DC resistance of the inductor 18 and thereby proportional to the instantaneous current through the output inductor 18. Thus, the output inductor current can be sensed without dissipating the output energy by monitoring the voltage across the capacitor 26. The output current is determined internal to the power controller circuit 22 based on the current droop signals. Although this information is not directly available from external to the power controller circuit 22, it could be derived externally from the current droop signals.

Figure 3:
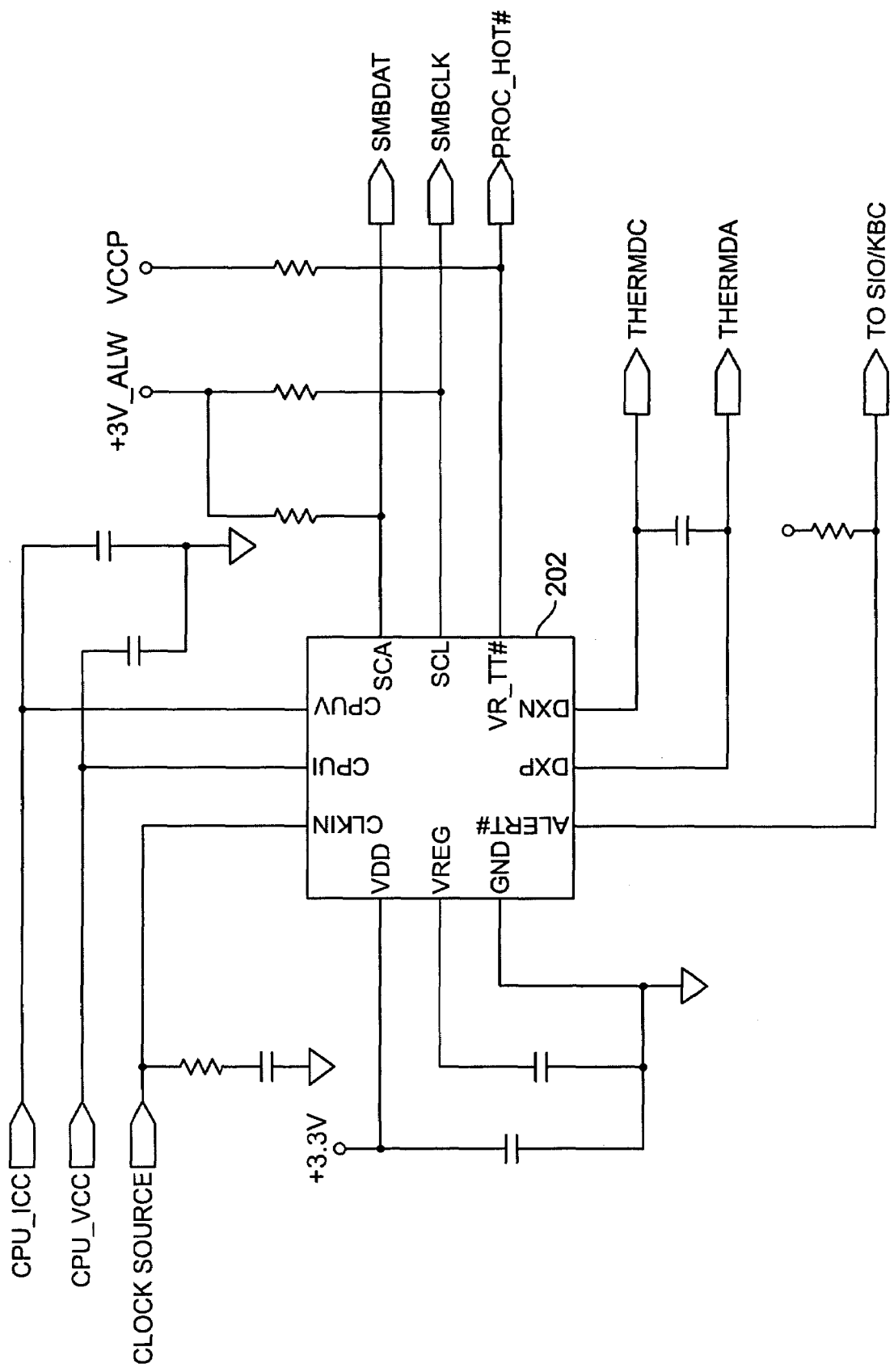
FIG. 3 is a schematic diagram of an embodiment of a measurement controller for the DC-to-DC voltage converter.

A measurement controller 32 is adapted to generate measurements of the CPU current and power based on certain input signals. The measurement controller 32 receives the voltage $V_{CC}$ sense signal from the CPU on a CPUV pin, and receives on a CPUI pin the analog voltage corresponding to the VID code from the output pin (DACOUT) of the power controller circuit 22. The measurement controller 32 further includes a data in/out port that enables communication with external circuitry. The measurement controller 32 may receive programming data corresponding to the load-line slope on the data in/out port, and may produce an output signal corresponding to the CPU current or power on the data in/out port. An embodiment of the measurement controller circuit 32 is shown in FIG. 3 (described below).

The measurement controller 32 determines the CPU current in accordance with the following method. The voltage at the FB+ pin of the power controller circuit corresponds to the output voltage $V_{CC}$ providing to the CPU, and can be represented as follows:

$$V_{OUT} = V_{DAC} - I_{LOAD} * AVP_{SLOPE}$$

wherein $V_{DAC}$ is the analog voltage on the DACOUT pin, $I_{LOAD}$ is the load (CPU) current, and $AVP_{SLOPE}$ is the load-line slope. The equation is rearranged to solve for the load current:

$$I_{LOAD} = (V_{DAC} - V_{OUT}) / AVP_{SLOPE}$$

Therefore, the load current $I_{LOAD}$ can be determined by measuring the DAC voltage and output voltage and scaling by the load-line slope.

The present method can be useful where it is necessary to determine total load (CPU) power consumption. An analog-to-digital converter (ADC) combined with a pair of sample-and-hold circuits can be used to convert the DAC voltage and output voltages in order to extract the load current information. Since the output voltage has already been acquired in order to obtain load current information, the load (CPU) power ($I_{LOAD} * V_{OUT}$) is easily calculated.

Referring now to FIG. 2, an embodiment of the power controller circuit 22 is shown in greater detail. It is anticipated that the power controller circuit be implemented on a single integrated circuit device, such as an application specific integrated circuit (ASIC) and the like. An exemplary power controller circuit is the SC452 manufactured by Semtech Corp. The power controller has a voltage error section including digital-to-analog (DAC) converter 101, amplifiers 102, 103, 104, and diode 105. The multibit VID code provided by the CPU is used to program the desired CPU core voltage $V_{CC}$, as discussed above. The VID code is provided to the DAC converter 101, which provides an analog voltage to the error amplifier 102. The analog voltage is also provided on the DAC output, which is in turn coupled to the measurement controller as discussed above. The DRP− and DRP+ signals reflecting the current droop signal are provided to the amplifier 104, which provides a voltage corresponding to current droop. Diode 105 allows only a positive output of amplifier to pass. The voltage feedback signal FB+ corresponding to the $V_{CC}$ sense signal from the CPU is combined with the current droop voltage and provided to amplifier 103, which produces a signal corresponding to the measured output voltage. Amplifier 102 thereby provides an output signal corresponding to the difference between the designed (i.e., programmed) voltage and the actual voltage.

The power controller further includes a current sense section including amplifiers 107, 108, 109 and multiplexer 110. The current sense section enables measurements from plural parts of the DC-DC converter (e.g., from current sense resistor, low-side MOSFET $R_{DSON}$, etc.), and amplifiers 107, 108 provide alternate measurements. Multiplexer 110 permits a selection of one of the two current measurements. The current measurement is added to either a low hysteresis value or high hysteresis value by multiplexer 111. Hysteretic comparator comprising amplifier 106, gate 113, and multiplexer 114. Amplifier 106 generates a voltage corresponding to the difference between the voltage error and the hysteresis-weighted current sense signal. The difference voltage drives the pulse width of the high-side and low-side switch drivers, as generally known in the art.

Referring now to FIG. 3, an embodiment of the measurement controller 32 is shown in greater detail. It is anticipated that the measurement controller be implemented on a single integrated circuit device 202, such as an application specific integrated circuit (ASIC) and the like. An exemplary measurement controller is the SH3501 manufactured by Semtech Corp. The measurement controller circuit 202 receives the voltage $V_{CC}$ sense signal from the CPU on a CPUV pin, and receives on a CPUI pin the analog voltage corresponding to the VID code from the output pin (DACOUT) of the power controller circuit 22. The measurement controller 202 further includes an I²C data bus (SCA, SCL) that enables communication with external circuitry.

Having thus described a preferred embodiment of a method and apparatus to provide real-time output current and power measurement for a DC-to-DC power converter having active voltage positioning, it should be apparent to those skilled in the art that certain advantages of the described system have been achieved. It should also be appreciated that various modifications, adaptations, and alternative embodiments thereof may be made within the scope and spirit of the present invention. The invention is defined solely by the following claims.

What is claimed is:

1. A switched mode power converter, comprising:
   at least one power switch operatively coupled to an input voltage source;
   an output filter operatively coupled to said at least one power switch to provide an output voltage and output current to a load;
   a control circuit coupled to said at least one power switch, said control circuit activating said at least one power switch with a duty cycle controlled to regulate at least one of said output voltage and said output current, said control circuit receiving a first control signal defining a desired value for said output voltage, a second control signal defining a relationship between voltage input and current draw for said load, and a voltage sense signal corresponding to an actual value of said output voltage, said control circuit thereby providing a measurement of load current therefrom.

2. The switched mode power converter of claim 1, wherein said first control signal further comprises a digital signal.

3. The switched mode power converter of claim 2, wherein said first control signal further comprises a voltage identification (VID) code.

4. The switched mode power converter of claim 2, wherein said control circuit further comprises a digital-to-analog converter receiving said first control signal and providing a corresponding voltage.

5. The switched mode power converter of claim 1, wherein said second control signal further comprises a load-line signal.

6. The switched mode power converter of claim 1, wherein said control circuit provides said measurement of load current in accordance with the following equation:

$$I_{LOAD} = (V_{DAC} - V_{OUT}) / AVP_{SLOPE}$$

wherein, $V_{DAC}$ is an analog voltage corresponding to the first control signal, $V_{OUT}$ is the voltage sense signal, $AVP_{SLOPE}$ is the slope of the second control signal, and $I_{LOAD}$ is the load current.

7. The switched mode power converter of claim 1, wherein said control circuit further receives a current droop signal corresponding to changes in said output current.

8. The switched mode power converter of claim 7, further comprising a current sensor operatively coupled to said output filter, said current sensor providing said current droop signal.

9. The switched mode power converter of claim 1, wherein said control circuit further comprises a data in/out port adapted to receive at least said second control signal and send at least said output current measurement.

10. The switched mode power converter of claim 1, wherein said load further comprises a microprocessor.

11. The switched mode power converter of claim 1, wherein said at least one power switch further comprises a high-side power switch and a low-side power switch.

12. A control circuit for use in a switched mode power converter including at least one power switch operatively coupled to an input voltage source, an output filter operatively coupled to said at least one power switch to provide an output voltage and output current to a load, said control circuit adapted to be operatively coupled to said at least one power switch, said control circuit activating said at least one power switch with a duty cycle controlled to regulate at least one of said output voltage and said output current, said control circuit receiving a first control signal defining a desired value for said output voltage, a second control signal defining a relationship between voltage input and current draw for said load, and a voltage sense signal corresponding to an actual value of said output voltage, said control circuit thereby providing a measurement of load current therefrom.

13. The control circuit of claim 12, wherein said first control signal further comprises a digital signal.

14. The control circuit of claim 13, wherein said first control signal further comprises a voltage identification (VID) code.

15. The control circuit of claim 13, further comprising a digital-to-analog converter receiving said first control signal and providing a corresponding voltage.

16. The control circuit of claim 12, wherein said second control signal further comprises a load-line signal.

17. The control circuit of claim 12, wherein said measurement of load current is derived in accordance with the following equation:

$$I_{LOAD}=(V_{DAC}-V_{OUT})/AVP_{SLOPE}$$

wherein, $V_{DAC}$ is an analog voltage corresponding to the first control signal, $V_{OUT}$ is the voltage sense signal, $AVP_{SLOPE}$ is the slope of the second control signal, and $I_{LOAD}$ is the load current.

18. The control circuit of claim 12, further comprising a data in/out port adapted to receive at least said second control signal and send at least said output current measurement.

19. A method for monitoring load current drawn by a microprocessor, comprising the steps of:

providing a regulated output voltage and output current to the microprocessor;

receiving a first control signal defining a desired value for said output voltage, a second control signal defining a relationship between voltage input and current drawn by said microprocessor, and a voltage sense signal corresponding to an actual value of said output voltage; and deriving the microprocessor load current in accordance with the following equation:

$$I_{LOAD}=(V_{DAC}-V_{OUT})/AVP_{SLOPE}$$

wherein, $V_{DAC}$ is an analog voltage corresponding to the first control signal, $V_{OUT}$ is the voltage sense signal, $AVP_{SLOPE}$ is the slope of the second control signal, and $I_{LOAD}$ is the load current.

20. The method of claim 19, wherein said first control signal further comprises a digital signal.

21. The method of claim 20, wherein said first control signal further comprises a voltage identification (VID) code.

22. The method of claim 2, further comprising converting said first control signal to a corresponding analog voltage.

23. The method of claim 19, wherein said second control signal further comprises a load-line signal.

* * * * *